July 28, 1942.  L. McLEAN  2,291,095

WATER FLOTATION APPARATUS

Filed Nov. 13, 1939  2 Sheets-Sheet 1

INVENTOR
LYLE McLEAN
BY
ATTORNEY

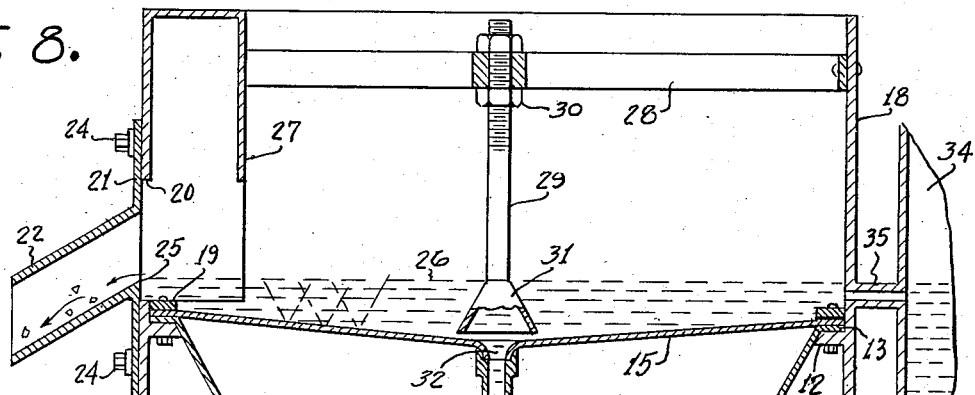
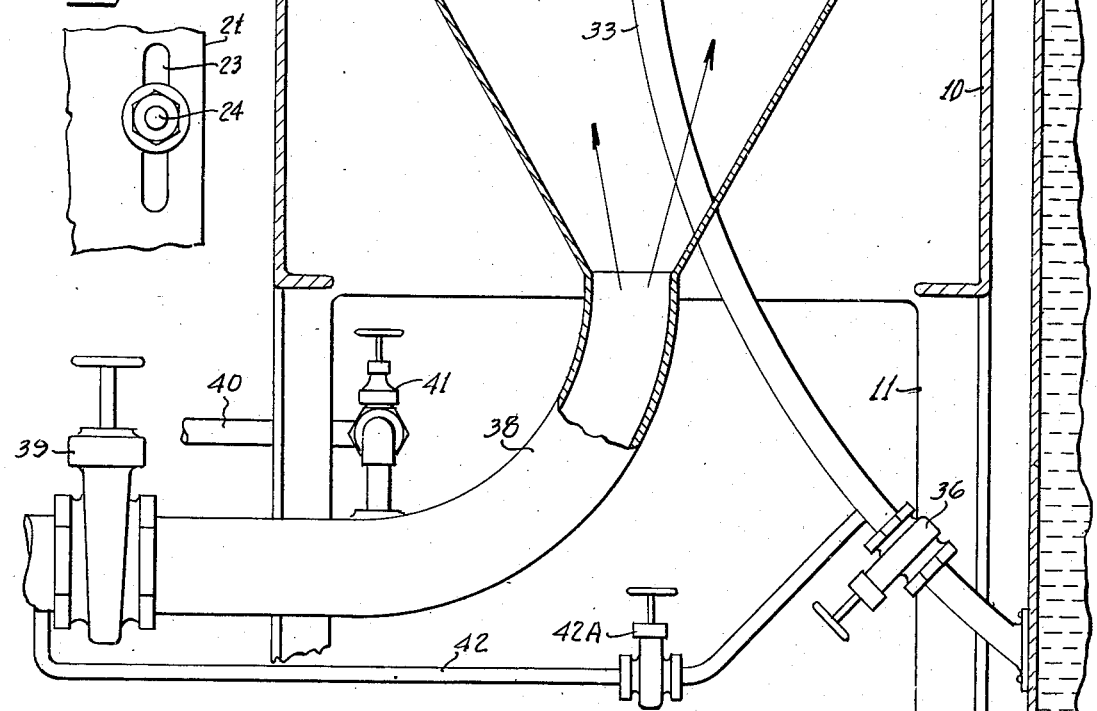
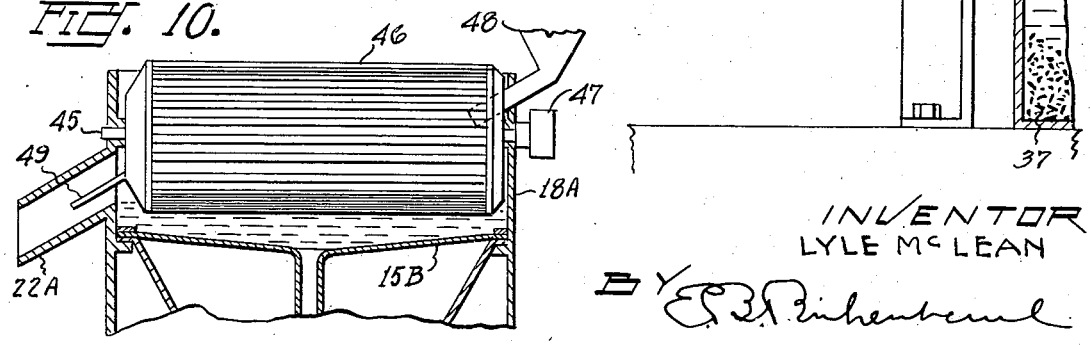

Patented July 28, 1942

2,291,095

UNITED STATES PATENT OFFICE 2,291,095

WATER FLOTATION APPARATUS

Lyle McLean, Portland, Oreg.

Application November 13, 1939, Serial No. 304,097

1 Claim. (Cl. 209—155)

This invention relates generally to mining, and particularly to a water flotation apparatus and process.

The main object of this invention is to construct an apparatus and employ a process whereby values may be recovered from materials at a relatively low cost and without an appreciable loss of values.

The second object is to construct an apparatus for recovering values with the use of either or both water and/or air.

The third object is to construct an apparatus of the class described wherein the recovery process may be made continuous and in which the degree of concentration may be regulated at will.

The fourth object is to construct an improved form of concentrating table in the form of a punched plate wherein the values may be collected and gravitated to a bleeder outlet.

The fifth object is to construct an apparatus of the class described including an auxiliary storage and settling tank from which the values may be easily withdrawn and which will at the same time afford a means for maintaining a predetermined depth of water over the punched plate.

The sixth object is to construct a special form of punched plate which is inexpensive to manufacture and which will afford the least resistance to the concentrating movement of the values.

I accomplish these and other objects in the manner set forth in the following specification as illustrated in the accompanying drawings, in which:

Fig. 8 is an enlarged vertical section through the apparatus.

Fig. 9 is a fragmentary vertical section of a portion of the waste outlet spout.

Fig. 10 is a vertical section through a modified form of the device wherein a trommel is disposed directly above the punched plate.

Similar numerals refer to similar parts throughout the several views.

Figure 1:
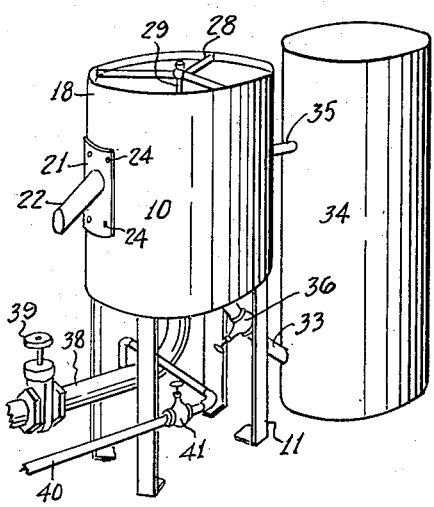
Fig. 1 is a perspective view of the apparatus.
Figure 2:
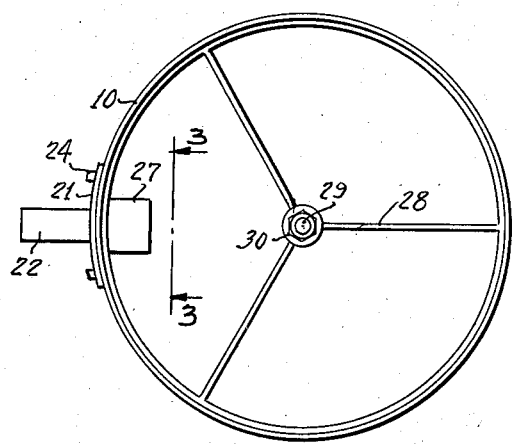
Fig. 2 is a plan of the concentrating section.
Figure 3:
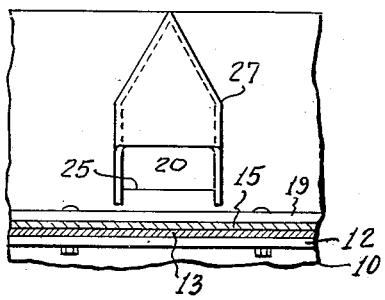
Fig. 3 is a fragmentary vertical section taken along the line 3—3 in Fig. 2.
Figure 4:
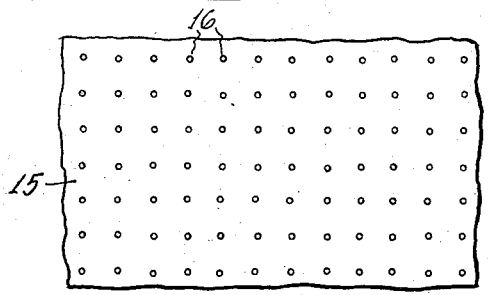
Fig. 4 is a fragmentary plan of a section of punched plate.

Referring in detail to the drawings, there is shown a cylinder 10 which is preferably mounted on the legs 11 and provided with an inturned flange 12 upon which rests the flange 13 of a conical funnel 14.

Figure 6:
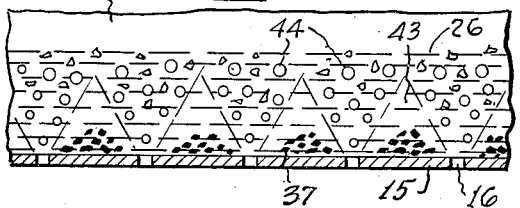
Fig. 6 is a fragmentary vertical section through a form of punched plate showing the manner in which the values collect between the holes and the air bubbles pass upwardly through the holes in diverging streams floating the waste material upwardly.
Figure 7:
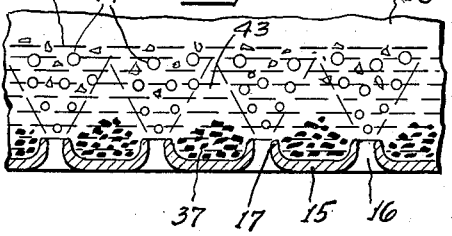
Fig. 7 is a view similar to Fig. 6 but showing the use of upwardly projecting holes in the punched plate.
Figure 5:
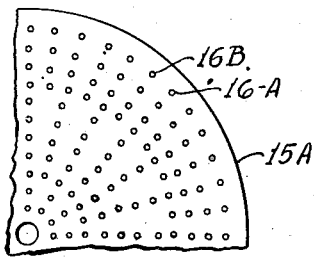
Fig. 5 is a fragmentary plan of a modified form of punched plate.

Above the funnel 14 is placed the punch plate 15 which may be of any of the types shown in Fig. 5, 6 or 7 although the type shown in Fig. 7 is preferred wherein the plate 15 is provided with a plurality of holes 16 having the upturned flanges 17 formed in the punching process.

The portion 18 of the cylinder 10 extends above the plate 15. A ring 19 is used to clamp the punched plate 15 upon the flange 12. The member 18 is provided with an outlet opening 20 against which is placed the flanged side 21 of the outlet chute 22. The flanged side 21 is provided with slots 23 to receive the bolts 24 and to permit the vertical adjustment of the chute 22 in order to vary the height of the edge 25 which determines the water level 26. A guard 27 is placed around the outlet 20 to prevent the escape of materials therefrom before they can be subjected to the concentrating action of the apparatus.

Across the member 18 is mounted a spider 28 to which the bolt 29 is secured by means of the nuts 30. Under the lower end of the bolt 29 is attached the conical foot 31 which is disposed over the bleeder opening 32. A bleeder pipe 33 connects the opening 32 with a tank 34.

The tank 34 is connected with the cylinder 10 by means of a pipe 35 disposed above the punched plate 15. The bleeder pipe 33 is preferably supplied with a valve 36 by means of which the passage of concentrates 37 through the pipe 33 may be controlled.

Air is supplied to the conical member 14 through the pipe 38 from a source not shown under the control of the air valve 39. Water may be admitted from the pipe 40 under the control of the valve 41 to the pipe 38 between the members 14 and 39.

A by-pass air pipe 42 connects the bleeder pipe 33 at a point between the valve 36 and the punched plate 15 to the air pipe 38 at a point before the air valve 39.

It will be noted in Fig. 5 that the holes 16—A are radial and extend to the bleeder opening 32, whereas the holes 16—B are only formed around the outer portion of the plate 15—A, the purpose being to keep the holes along the radial lines.

In Fig. 10 is shown punched plate 15—B which is surrounded by the wall 18—A across which journals the shaft 45 of a trommel 46 which is driven by the pulley 47 from any convenient source of power.

Coarse and fine material is inserted into the trommel 46 through the chute 48 and escapes therefrom by way of the lip 49 which extends into the chute 22—A. This form of the apparatus is especially adapted for use with clay soils which cling to the pieces of rock and hold values to the rocks, with which they ordinarily escape to the dump.

With this device, the rocks are tumbled in the trommel directly within the bath formed by the bubbling water on the punched plate 15—A causing the rocks to be cleanly washed and the values separated therefrom and delivered to the punched plate from whence they are recovered in the manner above described.

Attention is respectfully drawn to my co-pending applications, Serial No. 153,562, filed July 14, 1937; Serial No. 247,768, filed December 27, 1938; and Serial No. 272,285, filed May 6, 1939, over which this device is an improvement.

The operation of the device is as follows:

When material is permitted to flow into the section 18 upon the punched plate 15 and air is caused to flow upwardly through the pipe 38, it passes upwardly through the holes 16 causing the agitation of the materials, floating the lighter particles upward and permitting the heavier particles to collect between the openings 16 and to gravitate centrally to the bleeder opening 32.

Now, if water is admitted to the pipe 38 under the control of the valve 41, this water is also blown upwardly through the holes 16 accumulating on the top side of the plate 15 until the water level 26 is reached. This, of course, will not occur until the auxiliary tank 34 fills up to this level.

We now have the combined action of air and water, the water enabling the use of the differential in buoyancy between the gangue and the values, and the air serving to maintain a continuous state of agitation and serving as an upwardly propelling medium for the less dense pieces and particles and enabling values to descend to the surface of the punched plate. 15. The water too is capable of eliminating the dust which is present in dry separation and also renders unnecessary the drying of the materials where dry separation is employed.

It will be noted that as the concentrates 37 collect on the punched plate 15, they come to a rest on the relatively quiet zones 43 away from the agitating action of the bubbles 44.

In the normal operation of the device, the concentrates 37 move downwardly through the bleeder pipe 33 into the auxiliary tank 34 under the control of the valve 36.

If it is desired to increase the degree of concentration, air is admitted through the pipe 42 under the control of the valve 42—A, causing a reconcentration of the materials within the bleeder pipe 33 above the valve 36. This can, of course, be carried on to any desired point.

It must be understood that a body of water is maintained up to the level 26 upon the plate 15 and within the pipe 33. Little or no water enters into the funnel 14 except through the pipe 40 to offset evaporation and leakage, and this is only in the form of a spray. If, for example, the air flow was cut from the funnel 14, the water would pass downwardly through the openings 16; but this does not occur while the device is in operation.

It must be better understood that the holes 16 are between 20 and 30 thousandths of an inch in diameter and are spaced between two and three tenths of an inch apart.

I claim:

An apparatus of the class described, a combination of a perforated plate, the upper surface of which slopes toward an outlet opening, a bleeder pipe on the under side of said plate connected with said opening, means for maintaining a body of water on the upper surface of said perforated plate, means for forcing water and air upwardly through the openings in said plate and means for forcing air upwardly through said bleeder pipe.

LYLE McLEAN.